United States Patent
Vaidyanathan et al.

(10) Patent No.: US 8,762,080 B2
(45) Date of Patent: Jun. 24, 2014

(54) COMPUTER COMPONENT DETECTION SYSTEM AND METHOD

(75) Inventors: Kalyanaraman Vaidyanathan, San Diego, CA (US); Ramakrishna Dhanekula, Carlsbad, CA (US); Kenneth Gross, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 551 days.

(21) Appl. No.: 12/971,346

(22) Filed: Dec. 17, 2010

(65) Prior Publication Data
US 2012/0158326 A1   Jun. 21, 2012

(51) Int. Cl.
*G06F 17/18* (2006.01)
*G06F 11/00* (2006.01)

(52) U.S. Cl.
USPC .............................................. 702/58; 702/60

(58) Field of Classification Search
USPC .............................. 702/60, 58, 130, 136, 186
See application file for complete search history.

(56) References Cited

U.S. PATENT DOCUMENTS

| | | | |
|---|---|---|---|
| 6,889,908 B2 * | 5/2005 | Crippen et al. | 236/49.3 |
| 7,349,828 B1 * | 3/2008 | Ranganathan et al. | 702/186 |
| 7,725,285 B2 | 5/2010 | Dhanekula et al. | |
| 2009/0171612 A1 * | 7/2009 | Dhanekula et al. | 702/122 |
| 2009/0206842 A1 * | 8/2009 | Vaidyanathan et al. | 324/537 |
| 2010/0139360 A1 * | 6/2010 | Gross et al. | 73/1.16 |

* cited by examiner

*Primary Examiner* — John Breene
*Assistant Examiner* — Eman Alkafawi
(74) *Attorney, Agent, or Firm* — Brooks Kushman P.C.

(57) ABSTRACT

A method for identifying missing components of a computer system may include receiving telemetry signals characterizing a current configuration of the computer system and determining a cross power spectral density signature of at least some of the telemetry signals. The method may further include comparing information about the determined cross power spectral density signature with information about a predetermined cross power spectral density signature to determine whether a component is missing within the computer system.

20 Claims, 7 Drawing Sheets

COMPUTER COMPONENT DETECTION SYSTEM AND METHOD

BACKGROUND

As datacenters grow to include greater numbers of computer systems, maintaining the reliability of these computer systems is becoming an increasingly challenging task. One challenge is to ensure that filler modules are properly installed to fill the empty slots that are created when field-replaceable units are removed from the computer system. Filler modules, for example, may not be installed into empty slots during manufacture or service.

When filler modules are not present, the cooling air flow within the computer system may not be fully effective. Hence, the temperature of the system boards adjacent to the missing filler modules can increase. This may affect the long-term reliability of the system and may also trigger temperature alarm events.

Filler modules may be designed with electronic switches such that the computer system does not boot up if the filler modules are not installed in empty slots within the computer system. Extra pins and extra circuitry, however, may be necessary to support this arrangement, which may add complexity and cost.

SUMMARY

A computer component detection system may include one or more processors. The one or more processors may determine cross power spectral density information associated with temperature and fan speed operating signals of a computer system. The one or more processors may also compare the determined information with a library of cross power spectral density information to determine whether a component is missing within the computer system.

DETAILED DESCRIPTION

A cooling fan (or cooling fans) of a computer system (or within respective zones of a computer system) may experience sinusoidal stimulation via an algorithm that introduces a tiny periodic "wiggle" in the fan controller firmware for a brief duration. Telemetry data may be continuously collected during this sinusoidal stimulation. The normalized cross power spectral density (NCPSD) (in the frequency domain) of the collected data may then reveal the location of missing components (e.g., filler modules) within the computer system.

Telemetry signals, including temperature signals from various locations within the computer system and fan RPM (or mean fan RPM) signals, may be collected during a training phase in which various filler modules are inserted and/or removed to simulate a plurality of present/missing filler module configurations. The telemetry signals for each configuration may be analyzed via the NCPSD (frequency domain) to generate an associated NCPSD signature. These signatures (and/or data/information related thereto) may be stored and used as a reference to compare with the NCPSD (frequency domain) (and/or data/information related thereto) of telemetry signals collected during normal operation to determine whether a particular filler module is missing.

As an example, if the NCPSD signature of telemetry signals collected during normal operation substantially/approximately matches a stored NCPSD signature indicating that filler module "X" is missing, then it can be concluded that filler module "X" is missing. As another example, if the NCPSD signature of telemetry signals collected during normal operation has a peak value about an order of magnitude greater than a corresponding stored NCPSD signature indicating that filler module "Y" is present, then it can be concluded that filler module "Y" is present. Other scenarios are also possible.

The above arrangement(s)/technique(s) may reduce the circuit complexity and cost associated with the detection of missing filler modules for enterprise servers as additional internal hardware detection switches need not be implemented. The above arrangement(s)/technique(s) may also improve long term reliability for server platforms as the detection of missing filler modules may improve.

Figure 1:
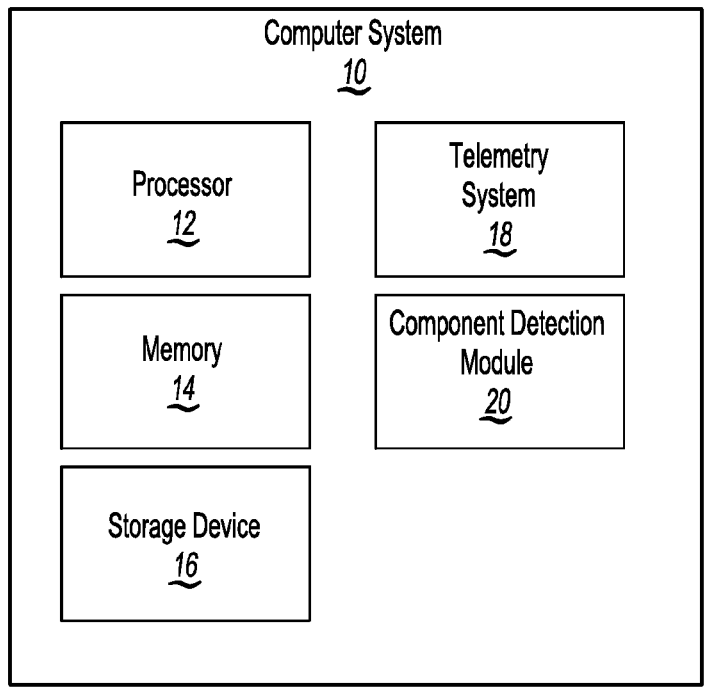
FIG. 1 is a block diagram of a computer system.

Referring to FIG. 1, a computer system 10 may include a processor 12, memory 14, storage device 16, telemetry system 18, and component detection module 20. The processor 12 may be a microprocessor, a mainframe computer, a digital signal processor, a personal organizer, a device controller and/or a computational engine within an appliance. The memory 14 may be DRAM, SRAM, flash memory, ROM, and/or any other type of memory. The storage device 16 may be coupled to a computer system and may include magnetic, optical, and/or magneto-optical technology. The storage device 16 may alternatively include flash memory and/or battery-backed up memory.

Telemetry system 18 may be separate from (or integrated with) computer system 10. Component detection module 20 may be separate from computer system 10 or may be included in telemetry system 18, etc. Other arrangements are also possible.

Figure 2:
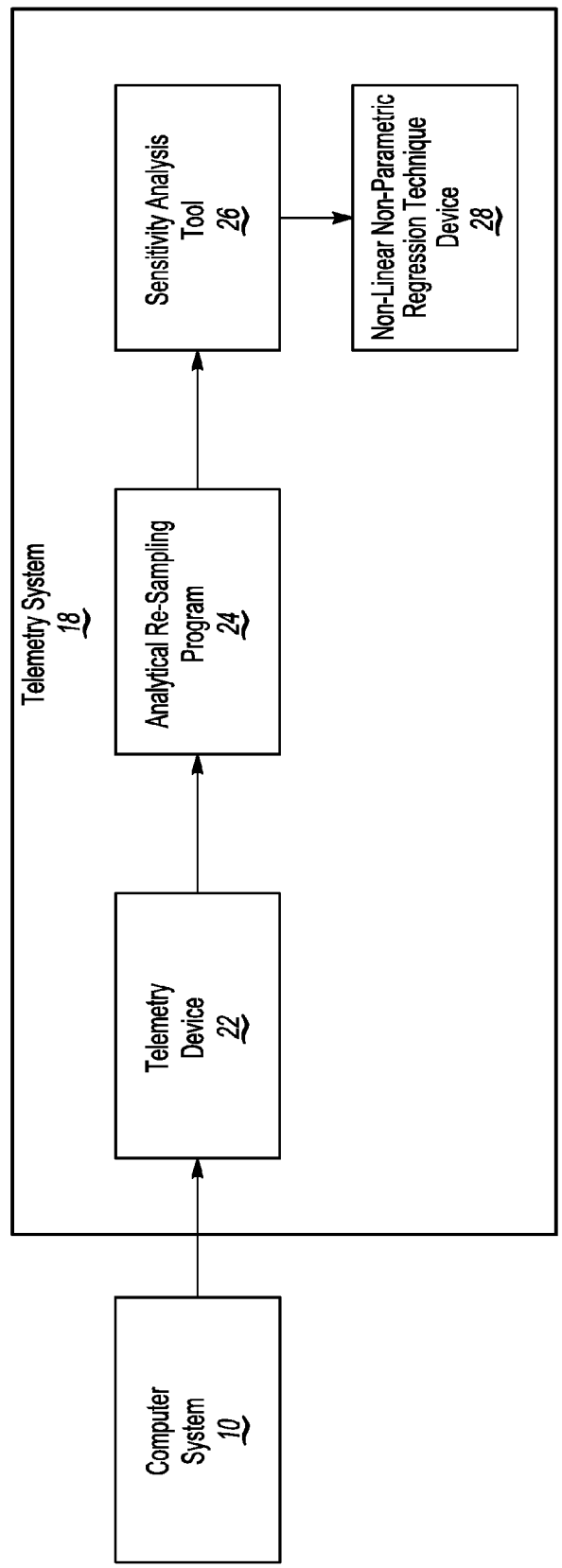
FIG. 2 is a block diagram of a telemetry system.

Referring to FIG. 2, the telemetry system 18 may include telemetry device 22, analytical re-sampling program 24, sensitivity analysis tool 26, and non-linear, non-parametric (NLNP) regression device 28. The telemetry device 22 may gather information from various sensors and monitoring tools within the computer system 10, and direct the signals to local or remote locations that include the analytical re-sampling program 24, sensitivity analysis tool 26, and NLNP regression device 28. In certain embodiments, the analytical re-sampling program 24, sensitivity analysis tool 26, and NLNP regression device 28 are located within the computer system 10. In other embodiments, the analytical re-sampling program 24, sensitivity analysis tool 26, and NLNP regression device 28 are located on a plurality of computer systems, including the computer system 10, and other remote computer systems. Other arrangements are also possible.

The analytical re-sampling program 24 may ensure that received signals have a uniform sampling rate. The analytical re-sampling program 24 may use interpolation techniques, if necessary, to fill in missing data points or to equalize the sampling intervals when raw data is non-uniformly sampled.

After the signals pass through analytical re-sampling program 24, they may be aligned and correlated by the sensitivity analysis tool 26. For example, the sensitivity analysis tool 26 may incorporate a moving window technique that slides through the signals with systematically varying window widths. The sliding windows systematically vary the alignment between windows for different signals to optimize the degree of association between the signals, as quantified by an F-statistic. The F-statistic is computed and ranked for all signal windows by the sensitivity analysis tool 26.

For statistically comparing the quality of two fits, F-statistics reveal the measure of regression: the greater the value of the F-statistic, the better the correlation between two signals. The lead/lag value for the sliding window that results in the F-statistic with the highest value is chosen, and the candidate signal is aligned to maximize this value. This process may be repeated for each signal.

Signals that have an F-statistic close to 1 are "completely correlated" and can be discarded. This can result when two signals are measuring the same metric, but are expressing them in different engineering units. For example, a signal can convey a temperature in degrees Fahrenheit, while a second signal can convey the same temperature in degrees Centigrade. Since these two signals are perfectly correlated, one does not include any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression device 28.

NLNP regression, in certain embodiments, is a multivariate state estimation technique (MSET). The term MSET may refer to a class of pattern recognition algorithms. For example, see "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000 ("Gribok"). This paper outlines several different pattern recognition approaches. Hence, the term MSET as used in this specification can refer to (among other things) any technique outlined in Gribok, including Ordinary Least Squares, Support Vector Machines, Artificial Neural Networks, MSET, or Regularized MSET.

The system components from which instrumentation signals originate may be field replaceable units (FRUs), which can be independently monitored. Note that all major system units, including both hardware and software, can be decomposed into FRUs. For example, a software FRU can include an operating system, a middleware component, a database, or an application.

Figure 3:
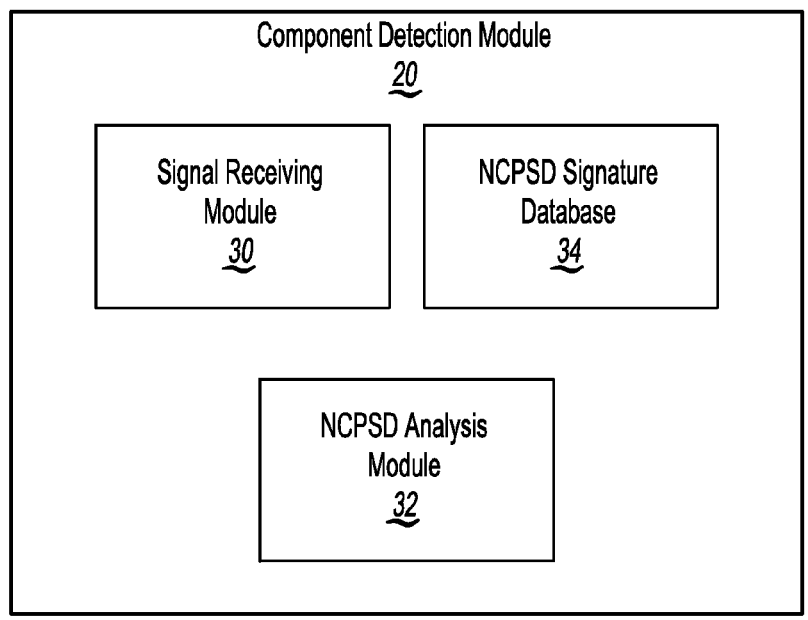
FIG. 3 is a block diagram of a component detection module.

Referring to FIGS. 1 and 3, the component detection module 20 may include a signal receiving module 30, NCPSD analysis module 32, and NCPSD signature database 34. The signal receiving module 30 may receive telemetry signals (e.g., temperature signals, fan rpm signals, etc.) from sensors (not shown) within the computer system 10 via the telemetry system 18. The NCPSD analysis module 32 may perform a Fast Fourier Transform of the telemetry signals to convert them to the frequency domain. Once in the frequency domain, the NCPSD analysis module 32 may compute the NCPSD of the telemetry signals. The computed NCPSD may be compared with NCPSD signatures stored in the NCPSD signature database 34. A match between the computed NCPSD and one of the stored NCPSD signatures, in some embodiments, may indicate which filler module(s) in the computer system 10 is missing. A difference in peak magnitude of the computed NCPSD and one of the stored NCPSD signatures, in other embodiments, may indicate which filler module(s) in the computer system 10 is missing.

During the training phase as explained above, a brief sinusoidal perturbation in fan speed (via the fan control firmware) may be introduced. At the same time, internal CPU temperature data corresponding to all CPU slots may be collected for various arrangements of present/missing filler modules. The signals may be transformed into the frequency domain and the NCPSD function between the fan RPM signal and each of the CPU temperature signals may be computed. The NCPSD functions may then be saved in a library. During the diagnostic phase, the same fan sinusoidal perturbation maneuver may be performed and the NCPSD values obtained. These NCPSD values may then be compared with those stored in the library to make a determination, and diagnostic warnings (e.g., alerts) generated about any missing CPU filler modules if appropriate.

The above described sinusoidal perturbation may create a significant spike in the frequency domain, even though the temperature variation in the time domain may be less than 1 degree and within the normal noise range for CPU temperatures. This procedure can be performed when the system is operating with any fan speed, and when the system is in the normal operating mode and experiencing load variances. This procedure may also be immune to changes in ambient temperatures.

Figure 4:
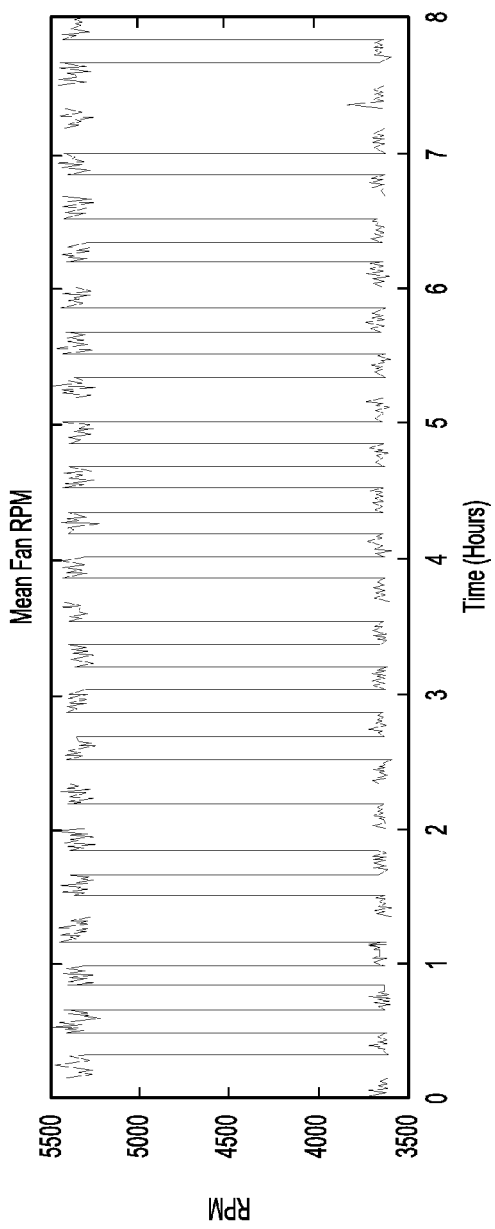
FIGS. 4 and 5 are plots of mean fan RPM and power spectral density, respectively, associated with an input signal to a fan controller.
Figure 5:
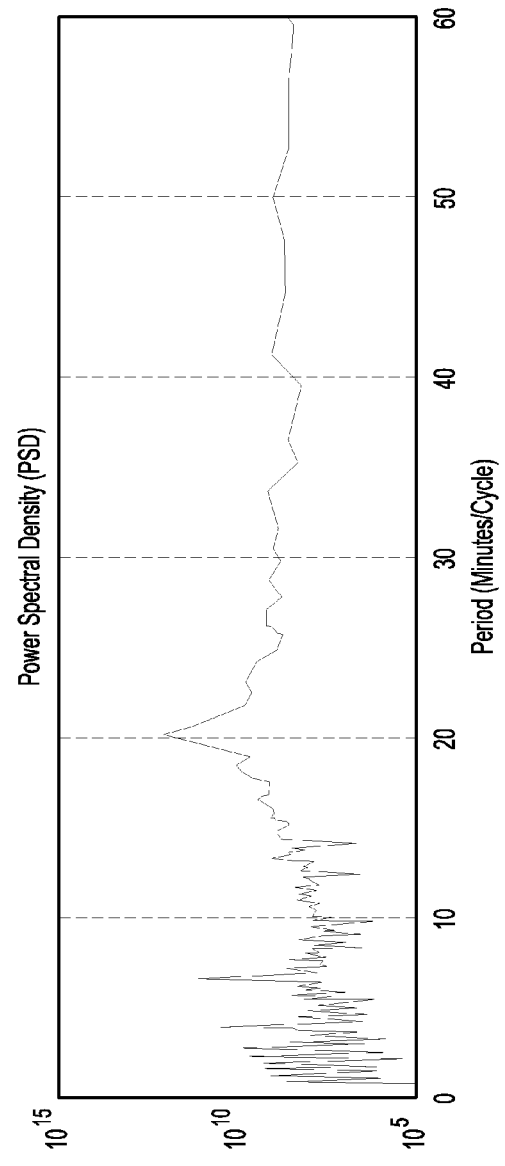

Test data was generated to demonstrate the above described techniques. FIGS. 4 and 5 show an example mean fan RPM and power spectral density, respectively, associated with an input signal to a fan controller.

Figure 6:
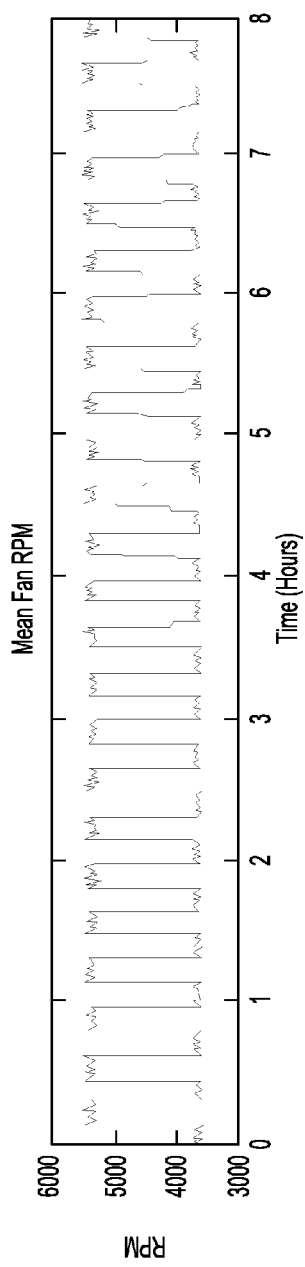
FIGS. 6, 7 and 8 are plots, respectively, of mean fan RPM, CPU core temperature, and the corresponding cross power spectral density thereof during a training phase.
Figure 7:
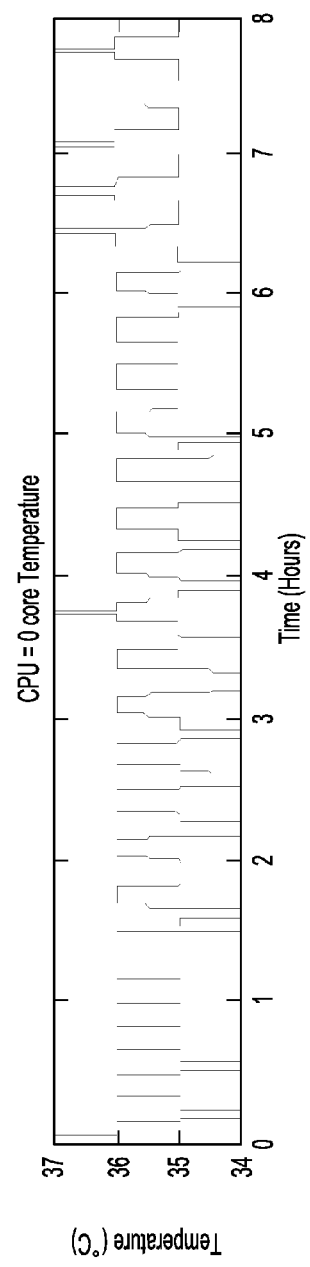
Figure 8:
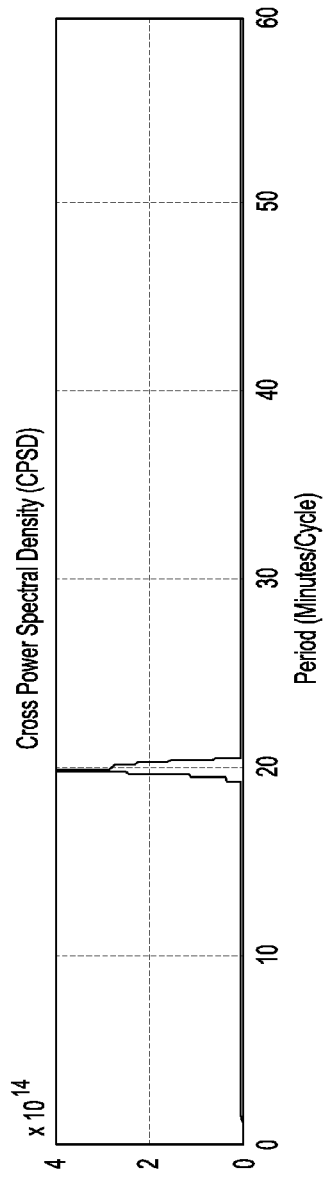
Figure 9:
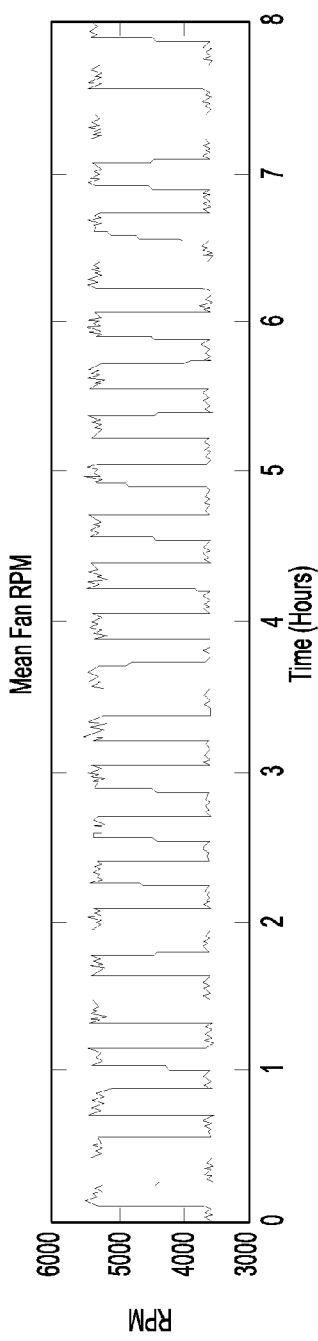
FIGS. 9, 10 and 11 are plots, respectively, of mean fan RPM, CPU core temperature, and the corresponding cross power spectral density thereof during a diagnostic phase.
Figure 10:
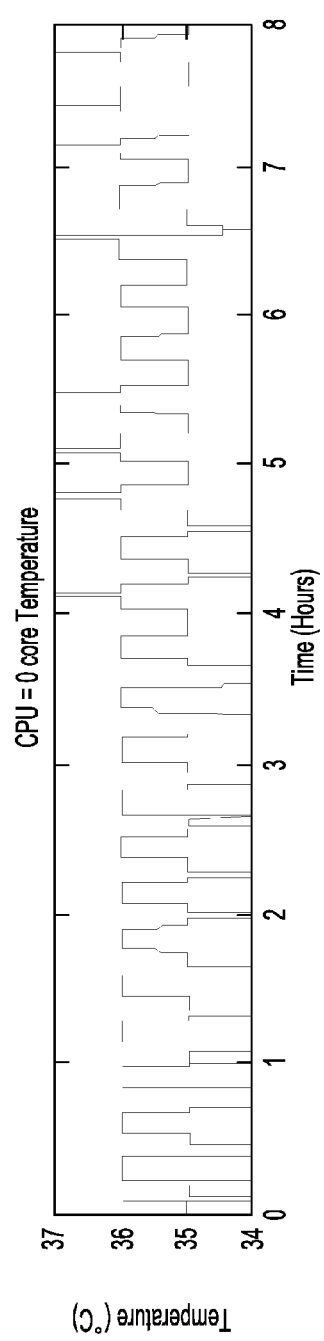
Figure 11:
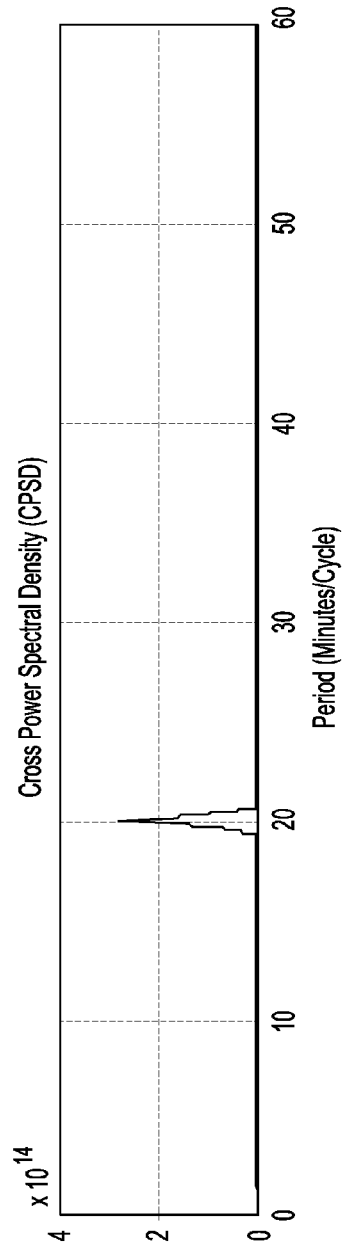

FIGS. 6, 7 and 8 show, respectively, example plots of mean fan RPM, CPU core temperature at a specified location, and the corresponding cross power spectral density signature in circumstances where all filler modules are present during a training phase. FIGS. 9, 10 and 11 show, respectively, example plots of mean fan RPM, CPU core temperature at the specified location, and the corresponding cross power spectral density signature in circumstances where all filler modules are present during a diagnostic phase. No significant differences are noted between the plots of FIGS. 8 and 11.

Figure 12:
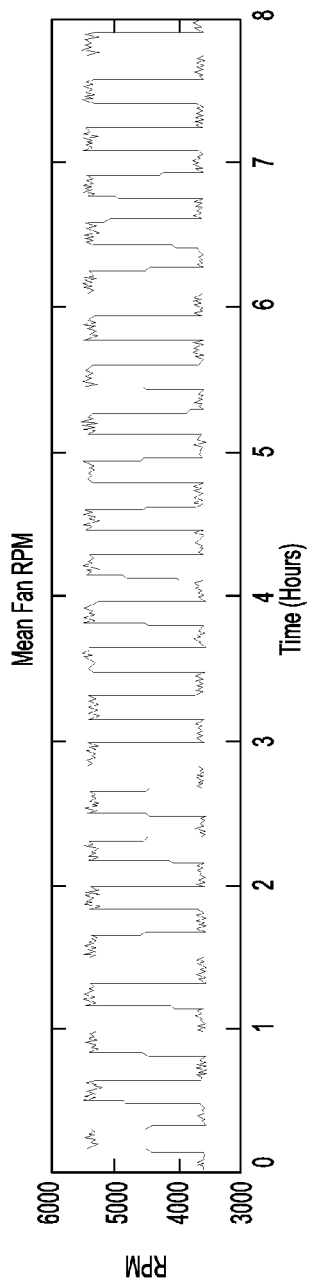
FIGS. 12, 13 and 14 are additional plots, respectively, of mean fan RPM, CPU core temperature, and the corresponding cross power spectral density thereof during a training phase.
Figure 13:
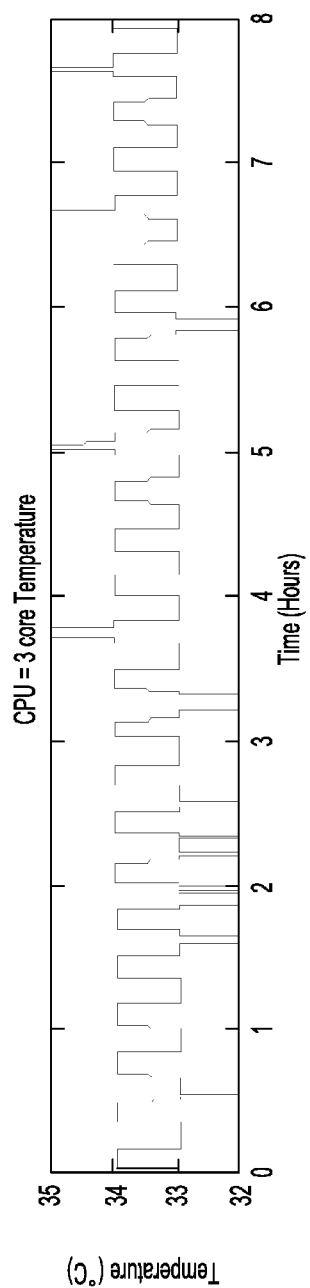
Figure 14:
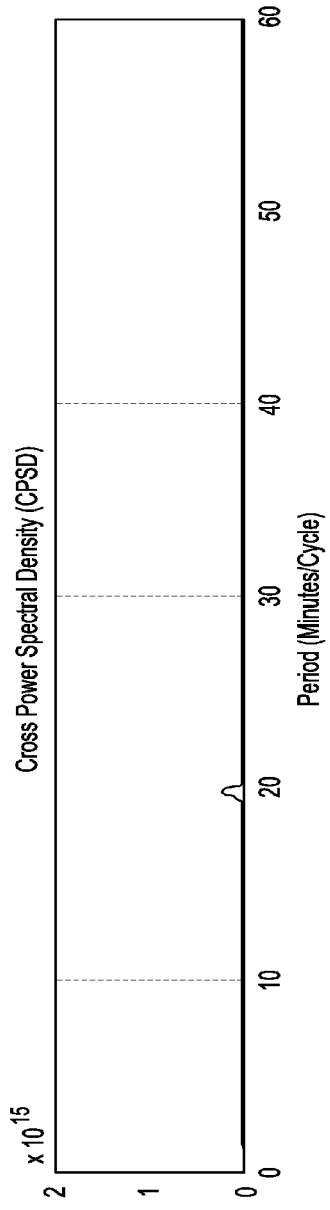
Figure 15:
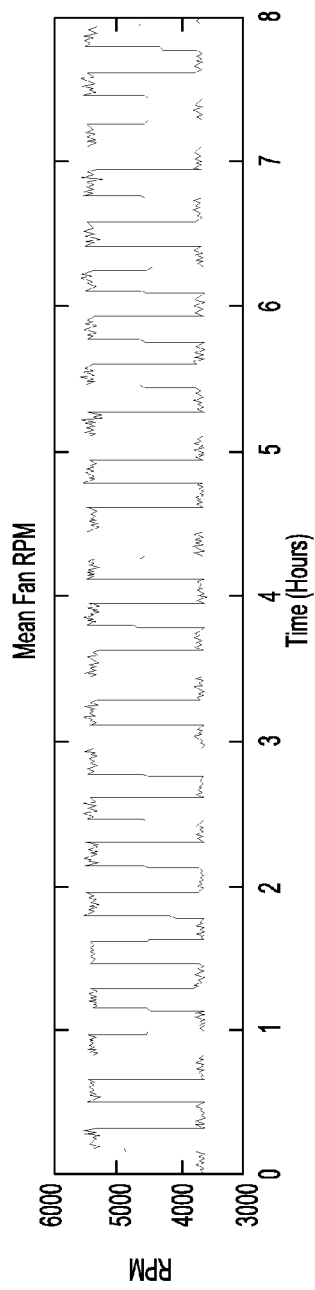
FIGS. 15, 16 and 17 are additional plots, respectively, of mean fan RPM, CPU core temperature, and the corresponding cross power spectral density thereof during a diagnostic phase.
Figure 16:
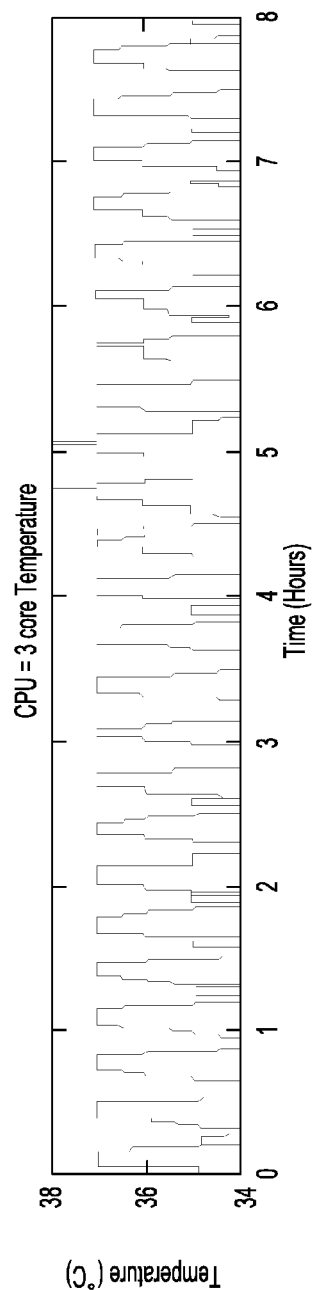
Figure 17:
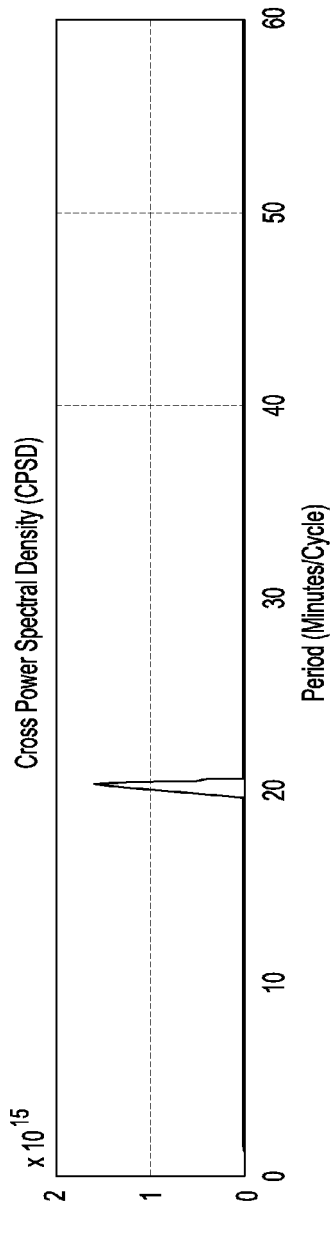

FIGS. 12, 13 and 14 show, respectively, example plots of mean fan RPM, CPU core temperature at another specified location, and the corresponding cross power spectral density signature in circumstances where all filler modules are present during a training phase. FIGS. 15, 16 and 17 show, respectively, example plots of mean fan RPM, CPU core temperature at another specified location, and the corresponding cross power spectral density signature in circumstances where the filler module adjacent to another specified location is missing during a diagnostic phase. The spike in the signature of FIG. 17 has a peak value an order of magnitude greater than the peak value of the spike in the signature of FIG. 14. The signature of FIG. 17 thus reveals that the filler module adjacent the another specified location is missing.

Embodiments disclosed herein need not be limited to server computer systems. In general, this disclosure may be applied to any type of computer system. This includes a computer system based on a microprocessor, a mainframe computer, a digital signal processor, a portable computing device, a personal organizer, a device controller, and/or a computational engine within an appliance.

Any data structures and/or code described in this detailed description may be stored on a computer-readable storage medium, which may be any device that can store code and/or data for use by a computer system. This may include volatile memory, non-volatile memory, magnetic and optical storage devices such as disk drives, magnetic tape, CDs, DVDs, or other devices capable of storing computer-readable media.

The algorithms disclosed herein may be deliverable to/implemented by a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits, Field-Programmable Gate Arrays, state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method for determining whether a component of a computer system is missing, the method comprising:
    at one or more processing devices,
        receiving telemetry signals characterizing a current configuration of the computer system,
        determining a cross power spectral density signature of at least some of the telemetry signals,
        determining whether a component is missing within the computer system based on a comparison of information about the determined cross power spectral density signature and information about a predetermined cross power spectral density signature; and
        outputting a signal indicating whether a component is missing within the computer system based on the determination of whether a component is missing.

2. The method of claim 1 wherein the comparison includes identifying whether there are indications of a missing component within the computer system.

3. The method of claim 1 further comprising associating the information about the predetermined cross power spectral density signature with a configuration of the computer system in which a component is missing.

4. The method of claim 1 wherein the comparison includes determining whether the information about the determined cross power spectral density signature substantially matches the information about the predetermined cross power spectral density signature.

5. The method of claim 1 further comprising causing a fan within the computer system to alternately operate between two different speeds while the telemetry signals are being collected.

6. The method of claim 1 further comprising converting the telemetry signals into a frequency domain.

7. The method of claim 1 wherein the telemetry signals include temperature information for various locations within the computer system.

8. The method of claim 1 wherein the telemetry signals include speed information for a fan within the computer system.

9. The method of claim 1 wherein the component is a filler module.

10. A computer component detection system comprising:
    one or more processors configured to determine cross power spectral density information associated with temperature and fan speed operating signals of a computer system, to determine whether a component is missing within the computer system based on a comparison of the determined information with a library of cross power spectral density information, and to output a signal indicating whether a component is missing within the computer system based on the determination of whether a component is missing.

11. The system of claim 10 wherein the one or more processors are further configured to collect the temperature and fan speed operating signals and to cause a fan within the computer system to alternately operate between two different speeds while the operating signals are being collected.

12. The system of claim 10 wherein the one or more processors are further configured to convert the temperature and fan speed operating signals into a frequency domain.

13. The system of claim 10 wherein the library includes a plurality of cross power spectral density signatures each of which is associated with a unique component configuration within the computer system.

14. The system of claim 10 wherein the component is a filler module.

15. A non-transitory computer-readable storage medium having instructions stored thereon that when executed cause a computer to determine a cross power spectral density signature of telemetry signals characterizing a current configuration of a computer system and compare information about the determined cross power spectral density signature with information about a predetermined cross power spectral density signature to determine whether a component is missing within the computer system.

16. The non-transitory computer-readable storage medium of claim 15 wherein the instructions further cause, when executed, the computer to cause a fan within the computer system to alternately operate between two different speeds while the telemetry signals are being collected.

17. The non-transitory computer-readable storage medium of claim 15 wherein the instructions further cause, when executed, the computer to convert the telemetry signals into a frequency domain before determining the cross power spectral density signature.

18. The non-transitory computer-readable storage medium of claim 15 wherein the comparing includes identifying whether there are indications of a missing component within the computer system.

19. The non-transitory computer-readable storage medium of claim 15 wherein the information about the predetermined cross power spectral density signature is associated with a configuration of the computer system in which a component is missing.

20. The non-transitory computer-readable storage medium of claim 15 wherein the comparing includes determining whether the information about the determined cross power spectral density signature substantially matches the information about the predetermined cross power spectral density signature.

* * * * *